(12) United States Patent
Huo

(10) Patent No.: US 11,340,614 B2
(45) Date of Patent: May 24, 2022

(54) ROBOT AND METHOD AND APPARATUS OF CONTROLLING MOVEMENT OF TRANSPORT ROBOT

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Feng Huo, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 217 days.

(21) Appl. No.: 16/605,575

(22) PCT Filed: Apr. 17, 2018

(86) PCT No.: PCT/CN2018/083277
§ 371 (c)(1),
(2) Date: Oct. 16, 2019

(87) PCT Pub. No.: WO2018/192465
PCT Pub. Date: Oct. 25, 2018

(65) Prior Publication Data
US 2020/0073395 A1    Mar. 5, 2020

(30) Foreign Application Priority Data
Apr. 17, 2017   (CN) .......................... 201710247046.7

(51) Int. Cl.
G05D 1/02    (2020.01)
(52) U.S. Cl.
CPC ......... G05D 1/0212 (2013.01); G05D 1/0272 (2013.01); *G05D 2201/0216* (2013.01)

(58) Field of Classification Search
CPC .................................................. G05D 1/0272
See application file for complete search history.

(56) References Cited

U.S. PATENT DOCUMENTS

| 4,556,940 A | 12/1985 | Katoo et al. |
| 4,727,303 A * | 2/1988 | Morse ............... G05B 11/42 |
| | | 318/616 |

(Continued)

FOREIGN PATENT DOCUMENTS

| CN | 1185206 A | 6/1998 |
| CN | 104656650 A | 5/2015 |

(Continued)

OTHER PUBLICATIONS

International Search Report dated Jul. 25, 2018 in PCT/CN2018/083277 filed on Apr. 17, 2018.

(Continued)

*Primary Examiner* — Jeff A Burke
*Assistant Examiner* — Madison B Emmett
(74) *Attorney, Agent, or Firm* — Oblon, McClelland, Maier & Neustadt, L.L.P.

(57) ABSTRACT

A method of controlling movement of a transport robot including determining a following error of a left driving wheel and a following error of a right driving wheel according to actual moving distances of the left driving wheel and the right driving wheel and a predetermined moving trajectory; determining a deviation error between the actual moving trajectory and the predetermined moving trajectory of the transport robot based on the following error of the left driving wheel and the following error of the right driving wheel; generating a position adjustment instruction of the left driving wheel and a position adjustment instruction of the right driving wheel according to the deviation error; transmitting the position adjustment instruction of the left driving wheel and the position adjustment instruction of the (Continued)

right driving wheel to a first servo driving system and a second servo driving system respectively to reduce a moving deviation.

16 Claims, 4 Drawing Sheets

(56) References Cited

U.S. PATENT DOCUMENTS

| | | | | |
|---|---|---|---|---|
| 8,490,723 | B2* | 7/2013 | Heinzmann | B60L 15/2009 180/7.1 |
| 2006/0238156 | A1* | 10/2006 | Kim | B25J 5/007 318/568.12 |
| 2009/0099717 | A1* | 4/2009 | Yabushita | G05D 1/0272 701/25 |
| 2009/0228166 | A1* | 9/2009 | Durkos | G05D 1/0219 701/26 |

FOREIGN PATENT DOCUMENTS

| | | |
|---|---|---|
| CN | 204844150 U | 12/2015 |
| CN | 105479460 A | 4/2016 |
| CN | 105974924 A | 9/2016 |
| CN | 106970621 A | 7/2017 |
| JP | 2002-215239 A | 7/2002 |

OTHER PUBLICATIONS

Chinese Office Actions dated Mar. 11, 2019 (total 8 pages) and dated Jul. 11, 2019 (total 6 pages) in Chinese Patent Application No. 201710247046.7 filed on Apr. 17, 2017.

* cited by examiner

ROBOT AND METHOD AND APPARATUS OF CONTROLLING MOVEMENT OF TRANSPORT ROBOT

CROSS-REFERENCE TO RELATED APPLICATIONS

The present disclosure is based on and claims priority of Chinese application for invention 201710247046.7, filed on Apr. 17, 2017, the disclosure of which is hereby incorporated into this disclosure by reference in its entirety.

TECHNICAL FIELD

The present disclosure relates to the field of robots, and more particularly to a method and an apparatus of controlling movement of a transport robot, and a transport robot.

BACKGROUND

The tide of the information age has promoted the continuous reform of the logistics industry, and robots and automation equipment are becoming a new force in the logistics industry. There are more and more applications for unmanned warehouses, in which transport robots are heavily used for the transport of goods.

According to the method of controlling movement of transport robots in the related art, closed-loop control is performed for two driving wheels respectively, and parameters are adjusted according to their respective response conditions to independently control the servo driving system of each driving wheel.

SUMMARY

The inventors have recognized that according to the method of controlling movement of a transport robot in the related art, there is no matching of the two independent servo driving systems, and different dynamic characteristics of the motors of the two servo driving systems may result in different responses, which greatly affects the fast and accurate movement of the robot according to a preset trajectory, making it difficult for the transport robot to make an accurate linear movement according to a predetermined trajectory.

In view of this, the present disclosure provides a robot, and a method and an apparatus of controlling movement of a transport robot, which can improve the accuracy of the moving trajectory of the transport robot.

According to an aspect of the present disclosure, A method of controlling movement of a transport robot, comprising: acquiring an actual moving distance of a left driving wheel and an actual moving distance of a right driving wheel of the transport robot; determining a following error of the left driving wheel and a following error of the right driving wheel of the transport robot at a current point according to the actual moving distance of the left driving wheel, the actual moving distance of the right driving wheel and a predetermined moving trajectory; determining a deviation error between the actual moving trajectory and the predetermined moving trajectory of the transport robot based on the following error of the left driving wheel and the following error of the right driving wheel, and generating a position adjustment instruction of the left driving wheel and a position adjustment instruction of the right driving wheel according to the deviation error; transmitting the position adjustment instruction of the left driving wheel and the position adjustment instruction of the right driving wheel to a first servo driving system for driving the left driving wheel and a second servo driving system for driving the right driving wheel respectively, to reduce a deviation between an actual moving trajectory and the predetermined moving trajectory of the transport robot, any position point on the actual moving trajectory corresponding to the actual moving distance of the left driving wheel and the actual moving distance of the right driving wheel.

Optionally, determining a following error of the left driving wheel and a following error of the right driving wheel of the transport robot at a current point comprises: setting a moving distance of the left driving wheel and a moving distance of the right driving wheel to be an abscissa and an ordinate in a Cartesian coordinate system respectively; setting the predetermined moving trajectory to be a straight line at an angle of 45 degrees with an axis of abscissas in the Cartesian coordinate system, any position point on the predetermined moving trajectory corresponding to a predetermined moving distance of the left driving wheel and a predetermined moving distance of the right driving wheel; determining a difference between the actual moving distance and the predetermined moving distance of the left driving wheel as the following error of the left driving wheel, and determining a difference between the actual moving distance and the predetermined moving distance of the right driving wheel as the following error of the right driving wheel.

Optionally, generating a position adjustment instruction of the left driving wheel and a position adjustment instruction of the right driving wheel comprises: performing a proportion-integration operation on the deviation error to acquire a position adjustment output; generating the position adjustment instruction of the left driving wheel and the position adjustment instruction of the right driving wheel based on the position adjustment output.

Optionally, generating the position adjustment instruction of the left driving wheel and the position adjustment instruction of the right driving wheel based on the position adjustment output comprises: converting a product of the position adjustment output and an adjustment coefficient of the left driving wheel into the position adjustment instruction of the left driving wheel; converting a product of the position adjustment output and an adjustment coefficient of the right driving wheel into the position adjustment instruction of the right driving wheel.

Optionally, the first servo driving system comprises a first position loop unit outputting a first position instruction, a first speed loop unit and a first motor, wherein the first position instruction is adjusted based on the position adjustment instruction of the left driving wheel to acquire a first control instruction, which acts on the first motor through the first speed loop unit to adjust a rotational speed of the first motor.

Optionally, the second servo driving system comprises: a second position loop unit outputting a second position instruction, a second speed loop unit and a second motor, wherein the second position instruction is adjusted based on the position adjustment instruction of the right driving wheel to acquire a second control instruction, which acts on the second motor through the second speed loop unit to adjust a rotational speed of the second motor.

Optionally, acquiring an actual moving distance of a left driving wheel and an actual moving distance of a right driving wheel of the transport robot comprises: collecting a first pulse information of the left driving wheel with a first encoder, and calculating the actual moving distance of the left driving wheel according to the first pulse information;

collecting a second pulse information of the right driving wheel with a second encoder, and calculating the actual moving distance of the right driving wheel according to the second pulse information.

According to still another aspect of the present disclosure, an apparatus of a controlling movement of transport robot is provided, comprising: memory; and one or more processors coupled to the memory, which are configured to, based on instructions stored in the memory, implement the method of controlling movement of a transport robot as described above.

According to still another aspect of the present disclosure, a transport robot is provided, comprising: an apparatus of controlling movement of the transport robot as described above.

The present disclosure further provides computer-readable storage medium in which instructions are stored, which when executed by one or more processors implement a method of controlling movement of a transport robot as described above.

According to the transport robot, the method and the apparatus of controlling movement of a transport robot of the present disclosure, a position adjustment instruction of the left driving wheel and a position adjustment instruction of the right driving wheel are generated based on the following errors of the left driving wheel and the right driving wheel to simultaneously control the operation of the two independent motors, changing the independent control of the motors into a coupled control. With this coupled control method, the problem of inconsistent response delay, parameter mismatch and load disturbance of the motors can be solved, so that the influence of the dynamic characteristics of each motor on movement of the transport robot is reduced, the moving trajectory accuracy of the transport robot is increased, and the moving stability of the transport robot is improved.

BRIEF DESCRIPTION OF THE DRAWINGS

In order to more clearly explain the technical solutions of the embodiments of the present disclosure or the prior art, a brief introduction will be given below for the drawings required to be used in the description of the embodiments or the prior art. It is obvious that, the drawings illustrated as follows are merely some of the embodiments of the present disclosure. For a person skilled in the art, he or she may also acquire other drawings according to such drawings on the premise that no inventive effort is involved.

DETAILED DESCRIPTION

The present disclosure will be described in more details with reference to the accompanying drawings, in which exemplary embodiments of the present disclosure are shown. Below, a clear and complete description will be given for the technical solution of embodiments of the present disclosure with reference to the figures of the embodiments. Obviously, merely some embodiments of the present disclosure, rather than all embodiments thereof, are given herein. All other embodiments obtained by those of ordinary skill in the art based on the embodiments of the present disclosure without creative efforts shall fall within the protection scope of the present disclosure. Various aspects of the technical solution of the present disclosure will be described with reference to the accompanying drawings and embodiments.

The use of the terms "first" and "second" below does not denote any quantity or timing, but are merely used to distinguish between different objects in the description.

Figure 1:
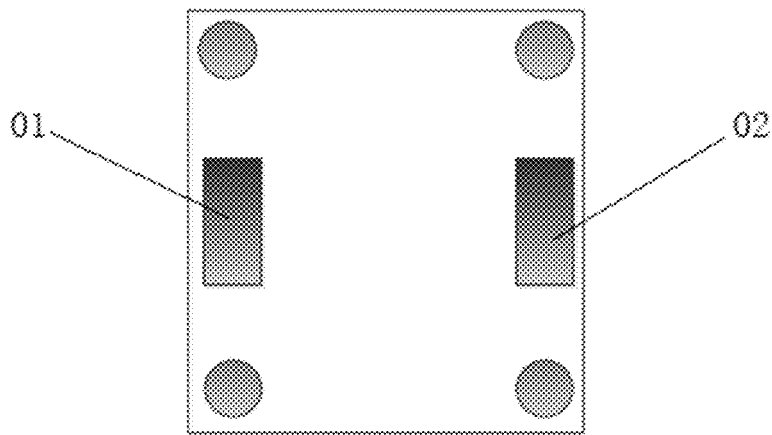
FIG. 1 is a schematic diagram showing the arrangement of driving wheels of a transport robot according to the present disclosure.

FIG. 1 is a schematic diagram showing the arrangement of driving wheels of a transport robot according to the present disclosure.

As shown in FIG. 1, a pair of driving wheels 01 and 02 are arranged under the chassis of a transport robot. The driving wheels 01 and 02 are driven by motors respectively. The two motors rotate in the same direction at the same speed to realize linear forward and backward movement of the robot. Reverse rotation of the two motors at the same speed realizes in-situ steering of the robot.

Figure 2:
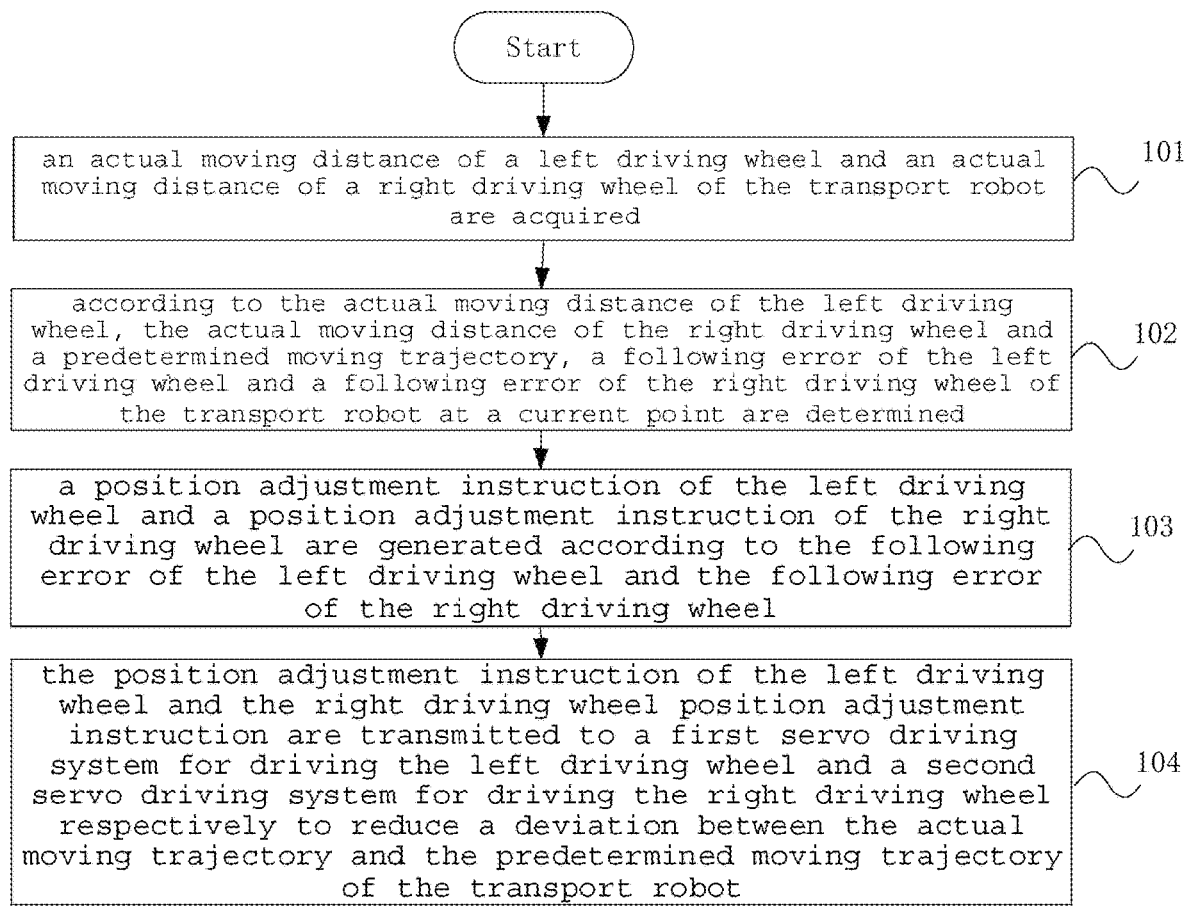
FIG. 2 is a flow diagram of a method of controlling movement of a transport robot according to some embodiments of the present disclosure.

FIG. 2 is a flow diagram of a method of controlling movement of a transport robot according to some embodiments of the present disclosure. As shown in FIG. 2, the method of this embodiment comprises steps 101-104.

At step 101, an actual moving distance of a left driving wheel and an actual moving distance of a right driving wheel of the transport robot are acquired.

The actual moving distances of the left driving wheel and right driving wheel can be acquired in various ways. For example, a first pulse information of the left driving wheel can be collected with a first encoder, and the actual moving distance of the left driving wheel can be calculated according to the first pulse information. A second pulse information of the right driving wheel can be collected with a second encoder, and the actual moving distance of the right driving wheel can be calculated according to the second pulse information. For example, a pulse marked as Cnt is generated by the first encoder in one revolution, the number of pulses (first pulse information) acquired by the first encoder when the left driving wheel moves to a current distance is marked as DeltaCnt, the gearbox acceleration ratio is marked as GearRatio, and the diameter of the left driving wheel is marked as D, then the actual moving distance of the left driving wheel is $SL=DeltaCnt/(Cnt*GearRatio)*\pi*D$. The calculation method of the actual moving distance of the right driving wheel is the same as the calculation method of the actual moving distance of the left driving wheel.

At step 102, according to the actual moving distance of the left driving wheel, the actual moving distance of the right driving wheel and a predetermined moving trajectory, a following error of the left driving wheel and a following error of the right driving wheel of the transport robot at a current point are determined.

The following error of the left driving wheel refers to a difference between a theoretical position of the left driving wheel on the predetermined moving trajectory and an actual position of the left driving wheel on the abscissa. The following error of the right driving wheel refers to a difference between a theoretical position of the right driving wheel on the predetermined moving trajectory and an actual position of the right driving wheel on the ordinate.

Any position point on the predetermined moving trajectory corresponds to a predetermined moving distance of the left driving wheel and a predetermined moving distance of the right driving wheel.

At step 103, a position adjustment instruction of the left driving wheel and a position adjustment instruction of the right driving wheel are generated according to the following error of the left driving wheel and the following error of the right driving wheel.

At step 104, the position adjustment instruction of the left driving wheel and the right driving wheel position adjustment instruction are transmitted to a first servo driving system for driving the left driving wheel and a second servo driving system for driving the right driving wheel respectively to reduce a deviation between the actual moving trajectory and the predetermined moving trajectory of the transport robot.

Any position point on the actual moving trajectory corresponds to an actual moving distance of the left driving wheel and an actual moving distance of the right driving wheel.

The servo driving system simply referred to as Servo is divided into a position loop, a speed loop, a current loop and so on from the outside to the inside. For example, the first servo driving system comprises: a first position loop unit, a first speed loop unit and a first motor. An output shaft of the first motor is coupled to the left driving wheel via a transmission system. The second servo driving system comprises: a second position loop unit, a second speed loop unit and a second motor. An output shaft of the second motor is coupled to the right driving wheel via a transmission system.

Both the first position loop unit and the second position loop unit may be in proportion (P) control, and both the first speed loop unit and the second speed loop unit may be in proportion-integration (PI) control. The PI control generates a control deviation according to a given value and an actual output value, and a proportion (P) and an integration (I) of the deviation are linearly combined to form a control quantity.

Figure 3:
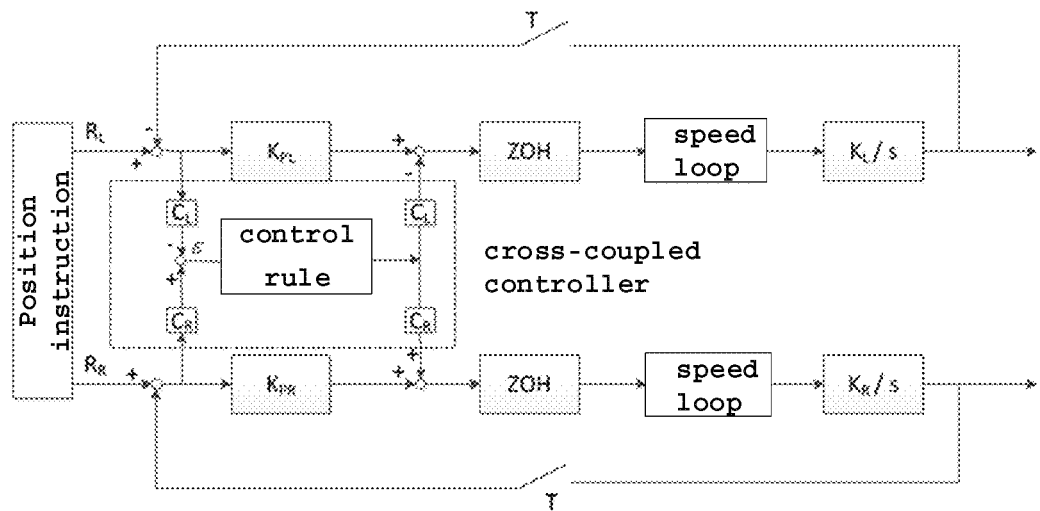
FIG. 3 is a frame schematic diagram of a servo driving system according to some embodiments of a method of controlling movement of a transport robot of the present disclosure.

The block diagram of the servo driving system in FIG. 3 shows the first servo driving system and the second servo driving system. In the first servo driving system and the second servo driving system, the speed loops adopt PI control, and the position loop units adopt P control. The proportional gain parameters of the position loops of the first servo driving system and the second servo driving system are $K_{PL}$ and $K_{PR}$ respectively. $K_L$ and $K_R$ are the integrated gains of the left and right wheel servo driving systems respectively. $R_L$ is a theoretical distance of the left driving wheel moved along a predetermined moving trajectory that is input through a position instruction module, that is, a predetermined moving distance of the left wheel. $R_R$ is the theoretical distance of the right driving wheel moved along a predetermined moving trajectory that is input through a position instruction module, that is, a predetermined moving distance of the right wheel. ZOH represents Zero-Order-Hold.

In some embodiments, the predetermined moving trajectory is a forward, backward or in-situ steering trajectory of the transport robot, and each of the moving distances of the left driving wheel and the right driving wheel is set to be an abscissa and an ordinate respectively in a Cartesian coordinate system; the predetermined moving trajectory is set to be a straight line at an angle of 45 degrees with the abscissa axis in the Cartesian coordinate system; the following error of the left driving wheel is determined as the difference between the actual moving distance of the left driving wheel and the predetermined moving distance of the left driving wheel, and the following error of the right driving wheel is determined as the difference between the actual moving distance of the right driving wheel and the predetermined moving distance of the right driving wheel.

Figure 4:
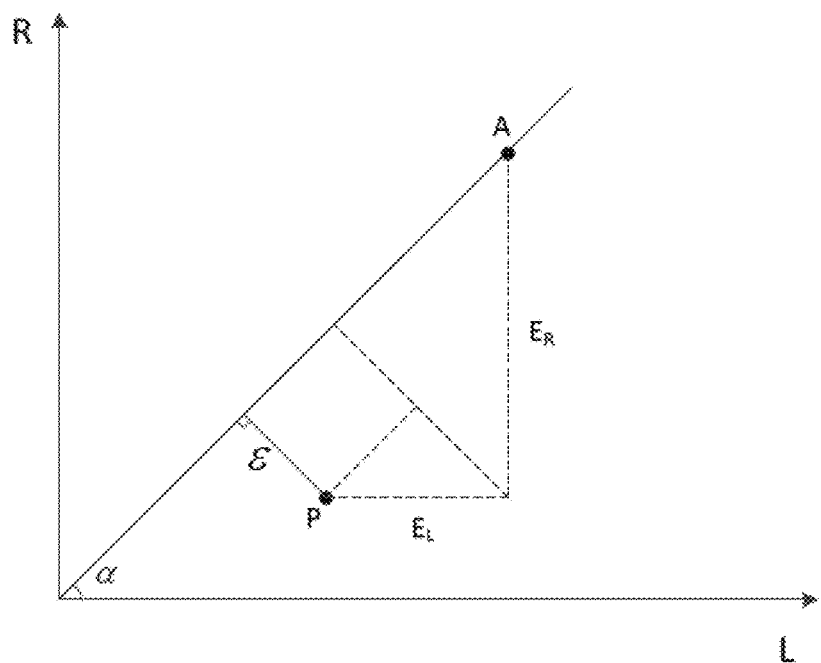
FIG. 4 is a schematic diagram showing a trajectory error according to some embodiments of the method of controlling movement of a transport robot of the present disclosure.

As shown in FIG. 4, the moving trajectory of the two driving wheels is placed in a Cartesian coordinate system, the coordinate axis R represents the moving distance of the right driving wheel, the coordinate axis L represents the moving distance of the left driving wheel, and the forward, backward or in-situ steering trajectory of the transport robot is a straight line in the Cartesian coordinate system, $\alpha=45°$. An actual moving position of the transport robot corresponds to a point in the coordinate system (such as P point in FIG. 4) in each control cycle, and in the same control cycle, there is also a theoretical moving position point of the transport robot on the 45-degree line (such as point A in FIG. 4).

For example, in a case of moving forward, backward, or in-situ steering, the two driving wheels of the transport robot have the same speed, and the predetermined moving distance of the left wheel and the predetermined moving distance of the right wheel at any time can be calculated. In this case, the predetermined moving distance of the left wheel is equal to the predetermined moving distance of the right wheel. At the same time, the actual moving distance of the left driving wheel and the actual moving distance of the right driving wheel can be obtained with a first encoder and a second encoder, wherein the actual moving distance of the left driving wheel and the actual moving distance of the right driving wheel are actual moving distances of the left and right driving wheels in this control circle. The following error of the left driving wheel is a difference between the actual moving distance of the left driving wheel and the predetermined moving distance of the left driving wheel, and the following error of the right driving wheel is a difference between the actual moving distance of the right driving wheel and the predetermined moving distance of the right driving wheel.

Assume that the current desired position of the transport robot is at point A, the current actual position of the transport robot is at point P, the deviation of point P from the linear moving trajectory is $\varepsilon$, $E_L$ is the following error of the left driving wheel at the current position, and $E_R$ is the following error of the right driving wheel at the current position.

A relationship between the trajectory deviation error and the following error can be derived from the geometric relationship shown in FIG. 4:

$$\varepsilon = -E_L C_L + E_R C_R \quad (1\text{-}1);$$

in the above formula, $C_L=\sin\alpha$, $C_R=\cos\alpha$, when $\alpha$ is 45 degrees, $$C_L = \sin\alpha = C_R = \cos\alpha = \frac{\sqrt{2}}{2}.$$

In some embodiments, a deviation error between the actual moving trajectory and the predetermined moving trajectory of the transport robot is determined based on the following error of the left driving wheel and the following error of the right driving wheel. As shown in FIG. 3, PI control can be used for the cross-coupled controller, which is more convenient than P control to reduce the steady-state error. Through a real-time calculation performed by reading a feedback from a motor encoding disk (i.e., an encoder), the actual moving distance of the left driving wheel and the actual moving distance of the right driving wheel are obtained. The differences between the actual moving distances of the left and right driving wheels and the predetermined moving distances of the left and right driving wheels are calculated respectively to obtain the following error of the left driving wheel and the following error of the right driving wheel.

The following error of the left driving wheel and the following error of the right driving wheel are brought into equation (1-1) to obtain a deviation error $\varepsilon$, on which a proportion-integration operation is performed to obtain a position adjustment output. The proportional information involved in the proportional calculation and the upper and lower limits involved in the integral calculation can be determined by testing according to the characteristics of the motors and the structure of the transport robot. A position adjustment instruction of the left driving wheel and a position adjustment instruction of the right driving wheel are generated based on a predetermined adjustment rule and the position adjustment output. There are various adjustment rules available, for example, a left driving wheel adjustment coefficient $C_L$ and a right driving wheel adjustment coefficient $C_R$ can be set and multiplied by the position adjustment output respectively to obtain the position adjustment instruction of the left driving wheel and the position adjustment instruction of the right driving wheel after a conversion.

The first servo driving system comprises: a first position loop unit, a first speed loop unit and a first motor. A sum or subtraction operation is performed on a position instruction output by the first position loop unit and the position adjustment instruction of the left driving wheel to obtain a first control instruction, which acts on the first motor through a first speed loop unit to adjust the speed of the first motor.

The second servo driving system comprises: a second position loop unit, a second speed loop unit and a second motor. A sum or subtraction operation is performed on a position instruction output by the second position loop unit and the right driving wheel position adjustment instruction to obtain a second control instruction, which acts on the second motor through a second speed loop unit to adjust the speed of the second motor, so that cross-coupled control of the two motors is achieved.

According to the transport robot, the method and the apparatus of controlling movement of a transport robot provided in the above embodiment, a position adjustment instruction of the left driving wheel and a position adjustment instruction of the right driving wheel are generated based on following errors of the left driving wheel and the right driving wheel to simultaneously control the operation of two independent motors, changing the independent control of the motors into a coupled control. With this coupled control method, the problem of inconsistent response delay, parameter mismatch and load disturbance of the motors can be solved, so that the influence of the motor dynamic characteristics of each motor on movement of the transport robot is reduced, the moving trajectory accuracy of the transport robot is increased, and the moving stability of the transport robot is improved.

Figure 5:
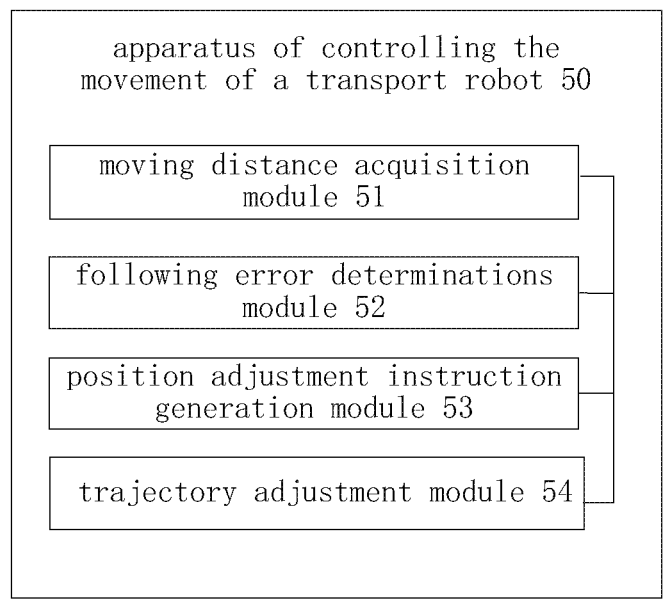
FIG. 5 is a block diagram of an apparatus of controlling movement of a transport robot according to some embodiments of the present disclosure.

In some embodiments, as shown in FIG. 5, the present disclosure provides an apparatus 50 of controlling movement of a transport robot, comprising: a moving distance acquisition module 51, a following error determination module 52, a position adjustment instruction generation module 53, and a trajectory adjustment module 54. The moving distance acquisition module 51 acquires an actual moving distance of a left driving wheel and an actual moving distance of a right driving wheel of the transport robot. The following error determination module 52 determines a following error of the left driving wheel and a following error of the right driving wheel of the transport robot at a current point according to an actual moving distance of the left driving wheel, an actual moving distance of the right driving wheel, and a predetermined moving trajectory.

The position adjustment instruction generation module 53 generates a position adjustment instruction of the left driving wheel and a position adjustment instruction of the right driving wheel according to the following error of the left driving wheel and the following error of the right driving wheel. The trajectory adjustment module 54 transmits the position adjustment instruction of the left driving wheel and the position adjustment instruction of the right driving wheel to a first servo driving system for driving the left driving wheel and a second servo driving system for driving the right driving wheel respectively to reduce a deviation between an actual moving trajectory and the predetermined moving trajectory of the transport robot.

The moving distance acquisition module 51 collects a first pulse information of the left driving wheel with a first encoder, calculates the actual moving distance of the left driving wheel according to the first pulse information, collects a second pulse information of the right driving wheel with a second encoder, and calculates the actual moving distance of the right driving wheel according to the second pulse information.

In some embodiments, the predetermined moving trajectory is a forward, backward or in-situ steering trajectory of the transport robot. The following error determination module 52 sets each of the moving distances of the left driving wheel and the right driving wheel to be an abscissa and an ordinate in a Cartesian coordinate system respectively. The following error determination module 52 sets the predetermined trajectory to be a straight line at an angle of 45 degrees with the abscissa axis in the Cartesian coordinate system. The following error determination module 52 determines the following error of the left driving wheel as the difference between the actual moving distance of the left driving wheel and the predetermined moving distance of the left driving wheel, and determines the following error of the right driving wheel as the difference between the actual moving distance of the right driving wheel and the predetermined moving distance of the right driving wheel.

The position adjustment instruction generation module 53 determines a deviation error between the actual moving trajectory and the predetermined moving trajectory of the transport robot based on the following error of the left driving wheel and the following error of the right driving wheel. The position adjustment instruction generation module 53 performs a proportion-integration operation, acquires a position adjustment output, and generates a position adjustment instruction of the left driving wheel and a position adjustment instruction of the right driving wheel based on the position adjustment output.

In the generation of the position adjustment instruction of the left driving wheel and the position adjustment instruction of the right driving wheel, the position adjustment instruction generation module 53 is specifically used to convert a product of the position adjustment output and an adjustment coefficient of the left driving wheel into the position adjustment instruction of the left driving wheel; convert a product of the position adjustment output and an adjustment coefficient of the right driving wheel into the position adjustment instruction of the right driving wheel.

The first servo driving system comprises: a first position loop unit, a first speed loop unit and a first motor. The trajectory adjustment module 54 performs a sum or subtraction operation on a position instruction output by the first position loop unit and the position adjustment instruction of the left driving wheel to acquire a first control instruction, which acts on the first motor through the first speed loop unit to adjust a rotational speed of the first motor.

The second servo driving system comprises: a second position loop unit, a second speed loop unit and a second motor. The trajectory adjustment module 54 performs a sum or subtraction operation on a position instruction output by the second position loop unit and the position adjustment instruction of the right driving wheel to acquire a second control instruction, which acts on the second motor through the second speed loop unit to adjust a rotational speed of the second motor.

Figure 7:
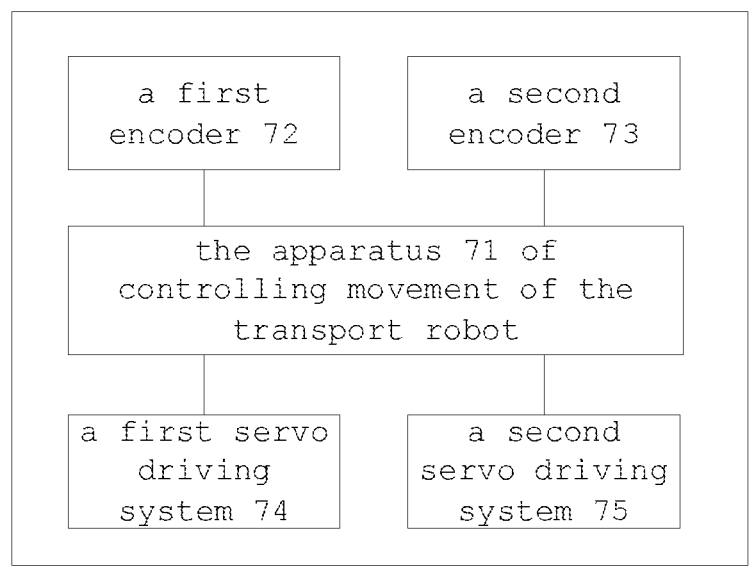
FIG. 7 is a schematic diagram of a transport robot according to the present disclosure.

In some embodiments, As shown in FIG. 7, the present disclosure provides a transport robot comprising the apparatus 71 of controlling movement of the transport robot in any one of the embodiments described above.

In some embodiments, the transport robot provided in the present disclosure further comprises: a first encoder 72 for collecting a first pulse information of the left driving wheel and a second encoder 73 for collecting a second pulse information of the right driving wheel, so that the apparatus of controlling movement of the transport robot calculates the actual moving distance of the left driving wheel according to the first pulse information, and calculates the actual moving distance of the right driving wheel according to the second pulse information.

As mentioned above, the transport robot further comprises: a first servo driving system 74 and a second servo driving system 75.

Figure 6:
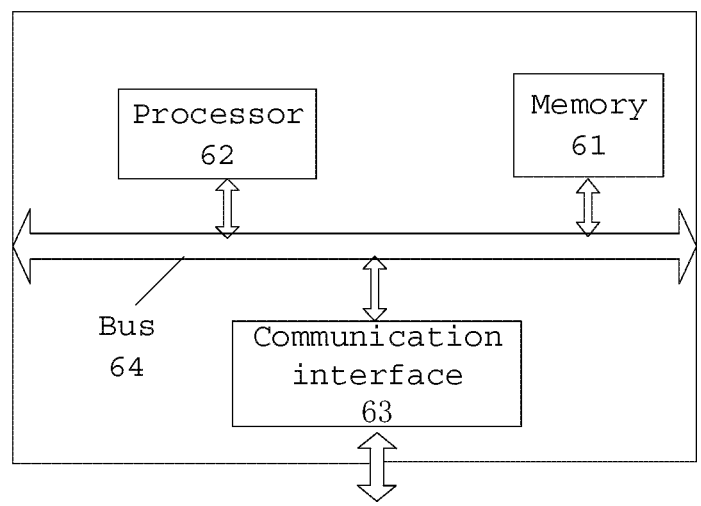
FIG. 6 is a block diagram of an apparatus of controlling movement of a transport robot according to other embodiments of the present disclosure.

FIG. 6 is a block diagram of the apparatus of controlling movement of a transport robot according to other embodiments of the present disclosure. As shown in FIG. 6, the apparatus may comprise a memory 61, a processor 62, a communication interface 63, and a bus 64. The memory 61 is used to store instructions. The processor 62 is coupled to the memory 61. And the processor 62 is configured to, based on instructions stored in the memory 61, implement the method of controlling movement of a transport robot described above.

The memory 61 may be a high speed RAM memory, a non-volatile memory and the like. The memory 61 may also be a memory array. The memory 61 may also be partitioned into blocks, which may be combined into virtual volumes according to a certain rule. The processor 62 may be a Central Processing Unit (CPU), or an Application Specific Integrated Circuit (ASIC), or one or more integrated circuits configured to implement the method of controlling movement of a transport robot of the present disclosure.

In some embodiments, the present disclosure provides a computer-readable storage medium on which computer program instructions are stored, which when executed by a processor implement the method of controlling movement of a transport robot according to any one of the above embodiments.

According to the transport robot, the method and the apparatus of controlling movement of a transport robot of the present disclosure, a position adjustment instruction of the left driving wheel and a position adjustment instruction of the right driving wheel are generated based on the following errors of the left driving wheel and the right driving wheel to simultaneously control the operation of the two independent motors, changing the independent control of the motors into a coupled control. With this coupled control method, the problem of inconsistent response delay, parameter mismatch and load disturbance of the motors can be solved, so that the influence of the dynamic characteristics of each motor on movement of the transport robot is reduced, the moving trajectory accuracy of the transport robot is increased, the moving stability of the transport robot is improved, and the safety of logistics delivery is guaranteed. In addition, movement of the unmanned warehouse transport robot can be controlled by the cross-coupled control method, and it can avoid the provision of a position correction sensor for the transport robot.

The method and system of the present disclosure may be implemented in many ways. For example, the method and system of the present disclosure may be implemented by software, hardware, firmware, or any combination of software, hardware, and firmware. The above sequence of steps of the method is merely for the purpose of illustration, and the steps of the method of the present disclosure are not limited to the above-described specific order unless otherwise specified. In addition, in some embodiments, the present disclosure may also be implemented as programs recorded in a recording medium, which comprise machine-readable instructions for implementing the method according to the present disclosure. Thus, the present disclosure also covers a recording medium storing programs for executing the method according to the present disclosure.

The above description of this invention is given for illustration and description, but is not exhaustive and is not intended to limit the present invention to the form disclosed herein. Various modifications and variations are apparent for an ordinary person of skilled in the art. Embodiments are selected and described for a better illustration of the principle and practical application of the present disclosure, so that those skilled in the art can understand the present disclosure and envisage various embodiments with various modifications suited to specific usages.

What is claimed is:

1. A method of controlling movement of a transport robot, comprising:
acquiring an actual moving distance of a left driving wheel and an actual moving distance of a right driving wheel of the transport robot;
determining a following error of the left driving wheel and a following error of the right driving wheel of the transport robot at a current point according to the actual moving distance of the left driving wheel, the actual moving distance of the right driving wheel and a predetermined moving trajectory, wherein determining a following error of the left driving wheel and a following error of the right driving wheel of the transport robot at a current point comprises:

setting a moving distance of the left driving wheel and a moving distance of the right driving wheel to be an abscissa and an ordinate in a Cartesian coordinate system respectively, setting the predetermined moving trajectory to be a straight line in the Cartesian coordinate system at an angle of 45 degrees to an axis of abscissas in the Cartesian coordinate system, any position point on the predetermined moving trajectory corresponding to a predetermined moving distance of the left driving wheel and a predetermined moving distance of the right driving wheel, and determining a difference between the actual moving distance and the predetermined moving distance of the left driving wheel as the following error of the left driving wheel, and determining a difference between the actual moving distance and the predetermined moving distance of the right driving wheel as the following error of the right driving wheel;

determining a deviation error between the actual moving trajectory and the predetermined moving trajectory of the transport robot based on the following error of the left driving wheel and the following error of the right driving wheel, and generating a position adjustment instruction of the left driving wheel and a position adjustment instruction of the right driving wheel according to the deviation error; and transmitting the position adjustment instruction of the left driving wheel and the position adjustment instruction of the right driving wheel to a first servo driving system for driving the left driving wheel and a second servo driving system for driving the right driving wheel respectively, to reduce a deviation between an actual moving trajectory and the predetermined moving trajectory of the transport robot, any position point on the actual moving trajectory corresponding to the actual moving distance of the left driving wheel and the actual moving distance of the right driving wheel.

2. The method according to claim 1, wherein generating a position adjustment instruction of the left driving wheel and a position adjustment instruction of the right driving wheel comprises:

performing a proportion-integration operation on the deviation error to acquire a position adjustment output;

generating the position adjustment instruction of the left driving wheel and the position adjustment instruction of the right driving wheel based on the position adjustment output.

3. The method according to claim 2, wherein generating the position adjustment instruction of the left driving wheel and the position adjustment instruction of the right driving wheel based on the position adjustment output comprises:

converting a product of the position adjustment output and an adjustment coefficient of the left driving wheel into the position adjustment instruction of the left driving wheel;

converting a product of the position adjustment output and an adjustment coefficient of the right driving wheel into the position adjustment instruction of the right driving wheel.

4. The method according to claim 1, wherein the first servo driving system comprises a first position loop unit outputting a first position instruction, a first speed loop unit and a first motor, wherein the first position instruction is adjusted based on the position adjustment instruction of the left driving wheel to acquire a first control instruction, which acts on the first motor through the first speed loop unit to adjust a rotational speed of the first motor;

the second servo driving system comprises: a second position loop unit outputting a second position instruction, a second speed loop unit and a second motor, wherein the second position instruction is adjusted based on the position adjustment instruction of the right driving wheel to acquire a second control instruction, which acts on the second motor through the second speed loop unit to adjust a rotational speed of the second motor.

5. The method according to claim 1, wherein acquiring an actual moving distance of a left driving wheel and an actual moving distance of a right driving wheel of the transport robot comprises:

collecting a first pulse information of the left driving wheel with a first encoder, and calculating the actual moving distance of the left driving wheel according to the first pulse information;

collecting a second pulse information of the right driving wheel with a second encoder, and calculating the actual moving distance of the right driving wheel according to the second pulse information.

6. An apparatus of controlling movement of a transport robot, comprising:

memory; and one or more processors coupled to the memory, which are configured to, based on instructions stored in the memory, implement a method of controlling movement of a transport robot comprising:

acquiring an actual moving distance of a left driving wheel and an actual moving distance of a right driving wheel of the transport robot;

determining a following error of the left driving wheel and a following error of the right driving wheel of the transport robot at a current point according to the actual moving distance of the left driving wheel, the actual moving distance of the right driving wheel and a predetermined moving trajectory, wherein determining a following error of the left driving wheel and a following error of the right driving wheel of the transport robot at a current point comprises:

setting a moving distance of the left driving wheel and a moving distance of the right driving wheel to be an abscissa and an ordinate in a Cartesian coordinate system respectively, setting the predetermined moving trajectory to be a straight line in the Cartesian coordinate system at an angle of 45 degrees to an axis of abscissas in the Cartesian coordinate system, any position point on the predetermined moving trajectory corresponding to a predetermined moving distance of the left driving wheel and a predetermined moving distance of the right driving wheel, and determining a difference between the actual moving distance and the predetermined moving distance of the left driving wheel as the following error of the left driving wheel, and determining a difference between the actual moving distance and the predetermined moving distance of the right driving wheel as the following error of the right driving wheel;

determining a deviation error between the actual moving trajectory and the predetermined moving trajectory of the transport robot based on the following error of the left driving wheel and the following error of the right driving wheel, and generating a position adjustment instruction of the left driving wheel and a position adjustment instruction of the right driving wheel according to the deviation error; and transmitting the position adjustment instruction of the left driving wheel and the position adjustment instruction of the right driving wheel to a first servo driving system for driving the left driving wheel and a second servo driving system for driving the right driving wheel respectively, to reduce a deviation between an actual moving trajectory and the predetermined moving trajectory of the transport robot, any position point on the actual moving trajectory corresponding to the actual moving distance of the left driving wheel and the actual moving distance of the right driving wheel.

7. A transport robot, comprising:
the apparatus of controlling movement of a transport robot according to claim 6.

8. The transport robot according to claim 7, further comprising:
a first encoder for collecting a first pulse information of a left driving wheel and a second encoder for collecting a second pulse information of a right driving wheel,
wherein the apparatus of controlling movement of the transport robot calculates an actual moving distance of the left driving wheel according to the first pulse information, and calculates an actual moving distance of the right driving wheel according to the second pulse information.

9. The transport robot according to claim 7, further comprising:
a first servo driving system and a second servo driving system,
wherein the first servo driving system comprises a first position loop unit outputting a first position instruction, a first speed loop unit and a first motor, wherein the first position instruction is adjusted based on the position adjustment instruction of the left driving wheel to acquire a first control instruction, which acts on the first motor through the first speed loop unit to adjust a rotational speed of the first motor;
wherein the second servo driving system comprises: a second position loop unit outputting a second position instruction, a second speed loop unit and a second motor, wherein the second position instruction is adjusted based on the position adjustment instruction of the right driving wheel to acquire a second control instruction, which acts on the second motor through the second speed loop unit to adjust a rotational speed of the second motor.

10. The apparatus according to claim 6, wherein generating a position adjustment instruction of the left driving wheel and a position adjustment instruction of the right driving wheel comprises:
performing a proportion-integration operation on the deviation error to acquire a position adjustment output;
generating the position adjustment instruction of the left driving wheel and the position adjustment instruction of the right driving wheel based on the position adjustment output.

11. The apparatus according to claim 6, wherein generating the position adjustment instruction of the left driving wheel and the position adjustment instruction of the right driving wheel based on the position adjustment output comprises:
converting a product of the position adjustment output and an adjustment coefficient of the left driving wheel into the position adjustment instruction of the left driving wheel;

converting a product of the position adjustment output and an adjustment coefficient of the right driving wheel into the position adjustment instruction of the right driving wheel.

12. The apparatus according to claim 6, wherein acquiring an actual moving distance of a left driving wheel and an actual moving distance of a right driving wheel of the transport robot comprises:
collecting a first pulse information of the left driving wheel with a first encoder, and calculating the actual moving distance of the left driving wheel according to the first pulse information;
collecting a second pulse information of the right driving wheel with a second encoder, and calculating the actual moving distance of the right driving wheel according to the second pulse information.

13. A non-transitory computer-readable storage medium in which instructions are stored, which when executed by one or more processors implement a method of controlling movement of a transport robot comprising:
acquiring an actual moving distance of a left driving wheel and an actual moving distance of a right driving wheel of the transport robot;
determining a following error of the left driving wheel and a following error of the right driving wheel of the transport robot at a current point according to the actual moving distance of the left driving wheel, the actual moving distance of the right driving wheel and a predetermined moving trajectory, wherein determining a following error of the left driving wheel and a following error of the right driving wheel of the transport robot at a current point comprises:
setting a moving distance of the left driving wheel and a moving distance of the right driving wheel to be an abscissa and an ordinate in a Cartesian coordinate system respectively,
setting the predetermined moving trajectory to be a straight line in the Cartesian coordinate system at an angle of 45 degrees to an axis of abscissas in the Cartesian coordinate system, any position point on the predetermined moving trajectory corresponding to a predetermined moving distance of the left driving wheel and a predetermined moving distance of the right driving wheel, and
determining a difference between the actual moving distance and the predetermined moving distance of the left driving wheel as the following error of the left driving wheel, and determining a difference between the actual moving distance and the predetermined moving distance of the right driving wheel as the following error of the right driving wheel;
determining a deviation error between the actual moving trajectory and the predetermined moving trajectory of the transport robot based on the following error of the left driving wheel and the following error of the right driving wheel, and generating a position adjustment instruction of the left driving wheel and a position adjustment instruction of the right driving wheel according to the deviation error; and
transmitting the position adjustment instruction of the left driving wheel and the position adjustment instruction of the right driving wheel to a first servo driving system for driving the left driving wheel and a second servo driving system for driving the right driving wheel respectively, to reduce a deviation between an actual moving trajectory and the predetermined moving trajectory of the transport robot, any position point on the actual moving trajectory corresponding to the actual moving distance of the left driving wheel and the actual moving distance of the right driving wheel.

14. The storage medium according to claim 13, wherein generating a position adjustment instruction of the left driving wheel and a position adjustment instruction of the right driving wheel comprises:
   performing a proportion-integration operation on the deviation error to acquire a position adjustment output;
   generating the position adjustment instruction of the left driving wheel and the position adjustment instruction of the right driving wheel based on the position adjustment output.

15. The storage medium according to claim 13, wherein generating the position adjustment instruction of the left driving wheel and the position adjustment instruction of the right driving wheel based on the position adjustment output comprises:
   converting a product of the position adjustment output and an adjustment coefficient of the left driving wheel into the position adjustment instruction of the left driving wheel;
   converting a product of the position adjustment output and an adjustment coefficient of the right driving wheel into the position adjustment instruction of the right driving wheel.

16. The storage medium according to claim 13, wherein acquiring an actual moving distance of a left driving wheel and an actual moving distance of a right driving wheel of the transport robot comprises:
   collecting a first pulse information of the left driving wheel with a first encoder, and calculating the actual moving distance of the left driving wheel according to the first pulse information;
   collecting a second pulse information of the right driving wheel with a second encoder, and calculating the actual moving distance of the right driving wheel according to the second pulse information.

* * * * *